United States Patent
Lee et al.

(10) Patent No.: US 12,352,887 B2
(45) Date of Patent: Jul. 8, 2025

(54) VEHICLE RADAR DEVICE AND CONTROL METHOD

(71) Applicant: HL KLEMOVE CORP., Incheon (KR)

(72) Inventors: Han Byul Lee, Gyeonggi-do (KR); Jung Hwan Choi, Seoul (KR); Jingu Lee, Gyeonggi-do (KR); Tae Hyeong Ha, Seoul (KR); Jae Hyun Han, Seoul (KR)

(73) Assignee: HL KLEMOVE CORP., Incheon (KR)

( * ) Notice: Subject to any disclaimer, the term of this patent is extended or adjusted under 35 U.S.C. 154(b) by 428 days.

(21) Appl. No.: 17/871,946

(22) Filed: Jul. 24, 2022

(65) Prior Publication Data

US 2023/0044436 A1 Feb. 9, 2023

(30) Foreign Application Priority Data

Jul. 26, 2021 (KR) .................. 10-2021-0097836

(51) Int. Cl.
*G01S 7/41* (2006.01)
*G01S 7/35* (2006.01)
(Continued)

(52) U.S. Cl.
CPC .............. *G01S 7/411* (2013.01); *G01S 7/356* (2021.05); *G01S 13/584* (2013.01); *G01S 13/931* (2013.01); *H01Q 1/3233* (2013.01)

(58) Field of Classification Search
CPC ........ G01S 7/411; G01S 7/356; G01S 13/584; G01S 13/931; H01Q 1/3233
See application file for complete search history.

(56) References Cited

U.S. PATENT DOCUMENTS 10,168,419 B2 1/2019 Trummer
2019/0310346 A1* 10/2019 Lee ................... G01S 13/867
(Continued)

FOREIGN PATENT DOCUMENTS

JP 2007-147532 6/2007
JP 6494712 4/2019
(Continued)

OTHER PUBLICATIONS

Office Action dated Feb. 20, 2024 for Korean Patent Application No. 10-2021-0097836 and its English translation from Global Dossier.

*Primary Examiner* — Bernarr E Gregory
*Assistant Examiner* — Hailey R Le
(74) *Attorney, Agent, or Firm* — WOMBLE BOND DICKINSON (US) LLP

(57) ABSTRACT

One embodiment of the disclosure relates to a vehicle radar device and a method for controlling the same. According to the present embodiments, a vehicle radar device may comprise an antenna unit including Nt transmission antennas and Nr reception antennas, wherein Nt is a natural number equal to or larger than 1, and Nr is a natural number equal to or larger than 2, a transceiver controlling the transmission antenna to transmit a transmission signal and the reception antenna to receive a reception signal reflected by a target, a signal processor detecting one or more peak signals for the target and separately detecting Nt*Nr channel reception signals corresponding to each peak signal, a target angle estimator calculating a target angle estimate from k channel reception signals selected from among the Nt*Nr channel reception signals, and a target size information estimator calculating size information about the target based on up to $_{Nt*Nr}C_k$ target angle estimates calculated by the target angle estimator.

14 Claims, 16 Drawing Sheets

(51) Int. Cl.
*G01S 13/58* (2006.01)
*G01S 13/931* (2020.01)
*H01Q 1/32* (2006.01)

(56) References Cited

U.S. PATENT DOCUMENTS

| | | | | |
|---|---|---|---|---|
| 2020/0408881 | A1* | 12/2020 | Kim | G01S 13/345 |
| 2021/0286048 | A1* | 9/2021 | Kitamura | G01S 13/931 |
| 2021/0364626 | A1* | 11/2021 | Schoor | G01S 7/354 |
| 2022/0196798 | A1* | 6/2022 | Chen | G01S 7/354 |
| 2022/0283284 | A1* | 9/2022 | Li | G01S 13/26 |
| 2022/0326009 | A1* | 10/2022 | Yan | G01S 13/46 |
| 2022/0381898 | A1* | 12/2022 | Zhang | G01S 7/006 |

FOREIGN PATENT DOCUMENTS

| | | |
|---|---|---|
| KR | 10-2015-0127188 | 11/2015 |
| KR | 10-2020-0126091 | 11/2020 |

* cited by examiner

VEHICLE RADAR DEVICE AND CONTROL METHOD

CROSS-REFERENCE TO RELATED APPLICATION

This application claims priority from Korean Patent Application No. 10-2021-0097836, filed on Jul. 26, 2021, which is hereby incorporated by reference for all purposes as if fully set forth herein.

BACKGROUND

Field

One embodiment of the disclosure relates to a vehicle radar device and a method for controlling the same. More specifically, embodiments of the disclosure relate to a radar device and method for estimating the angle of a target using k channel reception signals selected from among a plurality of channel reception signals and detecting length/width information about the target using the plurality of estimated angles.

Description of Related Art

To implement a function of a driver assistance system (DAS) recently in wide use, it is needed to obtain accurate target information and, to that end, multiple vehicle sensors are widely used which include, e.g., a camera sensor and a radar sensor.

Among them, the camera sensor has an advantage of being capable of obtaining accurate target information but its use is limited by the nighttime or weather environments, e.g., fog. The radar sensor addresses the shortcomings of the camera sensor by having relatively less nighttime or weather environment limitations.

The radar device includes one or more transmission antennas and one or more reception antennas and obtains target information, such as the location, distance, and speed of the target, using, e.g., the transmission signal, the reception signal reflected by the target, and mixed signals of the transmission signal and reception signal.

The vehicle radar device may be limited in device size and the number of available antennas due to use of a small device as compared with the radar devices in other technical fields and nonetheless requires precise detection performance. Given that, obtaining accurate target information by the vehicle radar sensor requires precise detection of target size information, such as the length or width of the target, as well as target location information, such as the azimuth information about the target.

BRIEF SUMMARY

In the foregoing background, the disclosure aims to provide a method for enhancing the horizontal detection performance of a vehicle radar.

Another objective of the disclosure is to provide a vehicle radar device and method capable of obtaining size information about a target using the vehicle radar device including multiple channels.

Another objective of the disclosure is to provide a vehicle radar device and method capable of calculating an angle estimate of a target using k channel reception signals selected from among a plurality of channel reception signals and detecting length/width information about the target using multiple calculated angle estimates (up to $_{Nt*Nr}C_k$ angle estimates).

To achieve the foregoing objectives, according to an embodiment of the disclosure, there may be provided a vehicle radar device comprising an antenna unit including Nt transmission antennas and Nr reception antennas, wherein Nt is a natural number equal to or larger than 1, and Nr is a natural number equal to or larger than 2, a transceiver controlling the transmission antenna to transmit a transmission signal and the reception antenna to receive a reception signal reflected by a target, a signal processor detecting one or more peak signals for the target and separately detecting Nt*Nr channel reception signals corresponding to each peak signal, a target angle estimator calculating a target angle estimate from k channel reception signals selected from among the Nt*Nr channel reception signals, and a target size information estimator calculating size information about the target based on up to $_{Nt*Nr}Ck$ ($N_t*N_r$ choose k combination calculate) target angle estimates calculated by the target angle estimator.

According to another embodiment, there may be provided a method for controlling a radar device, comprising transmitting a transmission signal from Nt transmission antennas and receiving a reception signal reflected by a target from Nr reception antennas, wherein Nt is a natural number equal to or larger than 1, and Nr is a natural number equal to or larger than 2, processing the reception signal to detect one or more peak signals for the target and separately detecting Nt*Nr channel reception signals corresponding to each peak signal, calculating a target angle estimate from k channel reception signals selected from among the Nt*Nr channel reception signals, and calculating size information about the target based on up to $_{Nt*Nr}C_k$ target angle estimates.

Each peak signal may include a frequency component. A distance to the target may be determined by the frequency component.

The target size information estimator may calculate the size information about the target based on target angle estimates during one detection period or calculate the size information about the target based on a target angle estimate accumulated during two or more detection periods. The detection period may be a frame period or a scan period.

k may be 2. The target angle estimator may calculate the target angle estimate ($\widehat{\theta_{ij}}$) based on a distance difference ($dn_{ij}$) and a phase difference ($\varphi_{ij}$) between a selected i-channel reception signal and a selected j-channel reception signal The target angle estimate ($\widehat{\theta_{ij}}$) may be calculated by $$\hat{\theta}_{ij} = \arcsin\left(\frac{\phi_{ij} \times \lambda}{2\pi \times dn_{ij}}\right),$$

wherein λ is a wavelength corresponding to a frequency component of a corresponding peak signal.

When Nt is 2 or more, Nt transmission antennas may transmit two or more transmission signals having orthogonality. The orthogonality between the two or more transmission signals may be implemented by one of time division multiplexing, code division multiplexing, and frequency division multiplexing.

The transmission signal may include a plurality of chirp signals. The signal processor may perform a first Fourier transform (1st FFT) on the reception signal to obtain a time component according to a range and perform a second Fourier transform (2nd FFT) to generate a range-Doppler map representing speed information according to the range.

The signal processor may distinguish a corresponding peak signal and Nt*Nr channel reception signals corresponding thereto, based on a range-speed index for each detection period.

Effects of the Disclosure

As is described below, according to the present embodiments, it is possible to enhance the horizontal detection performance of the vehicle radar.

More specifically, according to the present embodiments, it is possible to obtain size information (e.g., the length and width) about the target using a vehicle radar device including multiple channels.

Further, according to the present embodiments, it is possible to calculate an angle estimate of a target using k channel reception signals selected from among a plurality of channel reception signals and detect length/width information about the target using multiple calculated angle estimates (up to $_{Nt*Nr}C_k$ angle estimates).

DESCRIPTION OF DRAWINGS

The above and other objects, features, and advantages of the disclosure will be more clearly understood from the following detailed description, taken in conjunction with the accompanying drawings, in which.

DETAILED DESCRIPTION

Figure 1:
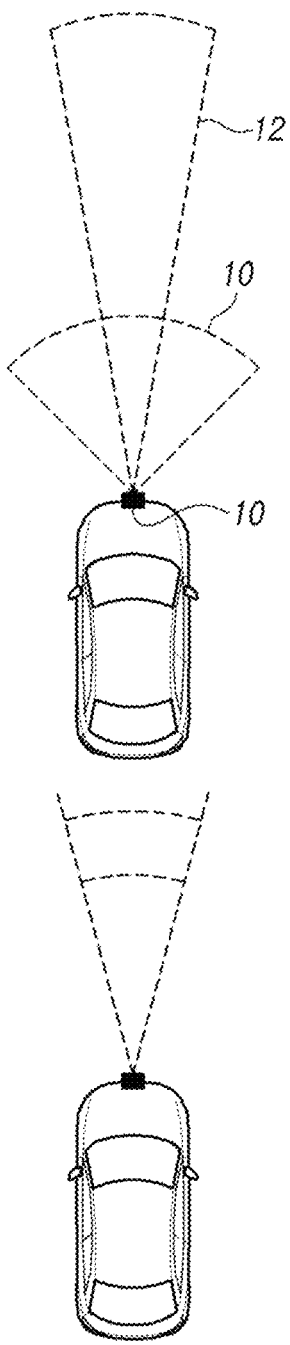
FIG. 1 illustrates an obtain detection scheme of a conventional vehicle radar sensor, in which a medium/long-range detection area and a short-range detection area are shown.

In the following description of examples or embodiments of the disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the disclosure, detailed descriptions of well-known functions and components incorporated herein will be omitted when it is determined that the description may make the subject matter in some embodiments of the disclosure rather unclear.

Terms, such as "first", "second", "A", "B", "(A)", or "(B)" may be used herein to describe elements of the disclosure. Each of these terms is not used to define essence, order, sequence, or number of elements etc., but is used merely to distinguish the corresponding element from other elements. When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element.

FIG. 1 illustrates an obtain detection scheme of a conventional vehicle radar sensor, in which a medium/long-range detection area and a short-range detection area are shown.

As shown in FIG. 1, detecting an object around a vehicle using a vehicle radar sensor needs both a medium/long-range detection function for detecting a long-range target ahead and a short-range detection function for detecting a short-range target around the vehicle.

Vehicles adopting a radar sensor use various types of driver assistance systems (DASs) to assist the driver in driving.

Among them, the adaptive cruise system (ACC) that follows the preceding vehicle needs to detect a medium/long-range target ahead of the vehicle in the driving direction.

The autonomous emergency braking system (AEB) or autonomous emergency steering system (AES) which performs emergency braking or steering avoidance on the vehicle when an obstacle is ahead, and the lane changing assistance (LCA) system which prevents collisions with an obstacle in an adjacent lane when changing lanes require high-accuracy detection of short-range obstacles around the vehicle.

In other words, the vehicle radar device needs to target information, such as the distances, speeds, and angular information about several targets in a wide range, at high accuracy.

In particular, in a general two-dimensional road driving environment, it is required to accurately measure lateral location information about the target including the distance and horizontal angle of the target rather than the vertical information.

To that end, as shown in the upper view of FIG. 1, for medium/long-range detection, some vehicle radar device 10 may be configured to have a long-range detection area 12 which has a relatively narrow detection angle and a long detection range and a short-range detection area 14 which has a wide detection area and a short detection range.

For medium/long-range detection, the vehicle radar sensor device should transmit the transmission signal in a medium/long-range transmission beam pattern and, for short-range detection, should transmit the transmission signal in a short-range transmission beam pattern different from the medium/long-range transmission beam pattern.

However, such radar device suffers from a complicated structure and an increased signal processing computation load due to the need for the two-mode antenna structure according to the distance and a signal processor.

To address this issue, it is needed to integrate the medium/long-range radar and the short-range radar, and a scheme being considered to integrate the medium/long-range radar and the short-range radar is to provide different transmission antennas while allowing a rotational axis to be shared.

In other words, as shown in the lower view of FIG. 1, a radar device with a single detection area is provided which is implemented to vary the horizontal information distance resolution depending on the distance from the target to thereby simplify the structure while enhancing the accuracy of target horizontal information.

The conventional radar device mixes the transmission signal and the reception signal reflected by the target to generate a composite signal and, based thereupon, determines the distance to the target and the azimuth.

In this case, the reception signals through multiple channels (which are defined as a combination of the transmission antenna and the reception antenna) are mixed to detect the peak signal which is then used to detect information about the target.

Since the peak signal is a composite signal of the reception signals reflected at several points of the target, the peak signal represents the averaged target location, rather than a specific location of the target.

Accordingly, the conventional radar device is able to obtain only distance/azimuth information in an approximate and average area of the target.

In contrast, an obstacle affecting the traveling of the host vehicle is an object having a certain length or width, such as another vehicle.

Accordingly, only distance/azimuth information in a specific location of the target is insufficient, and it is required to precisely measure size information, such as the length or width of the target.

Figure 2:
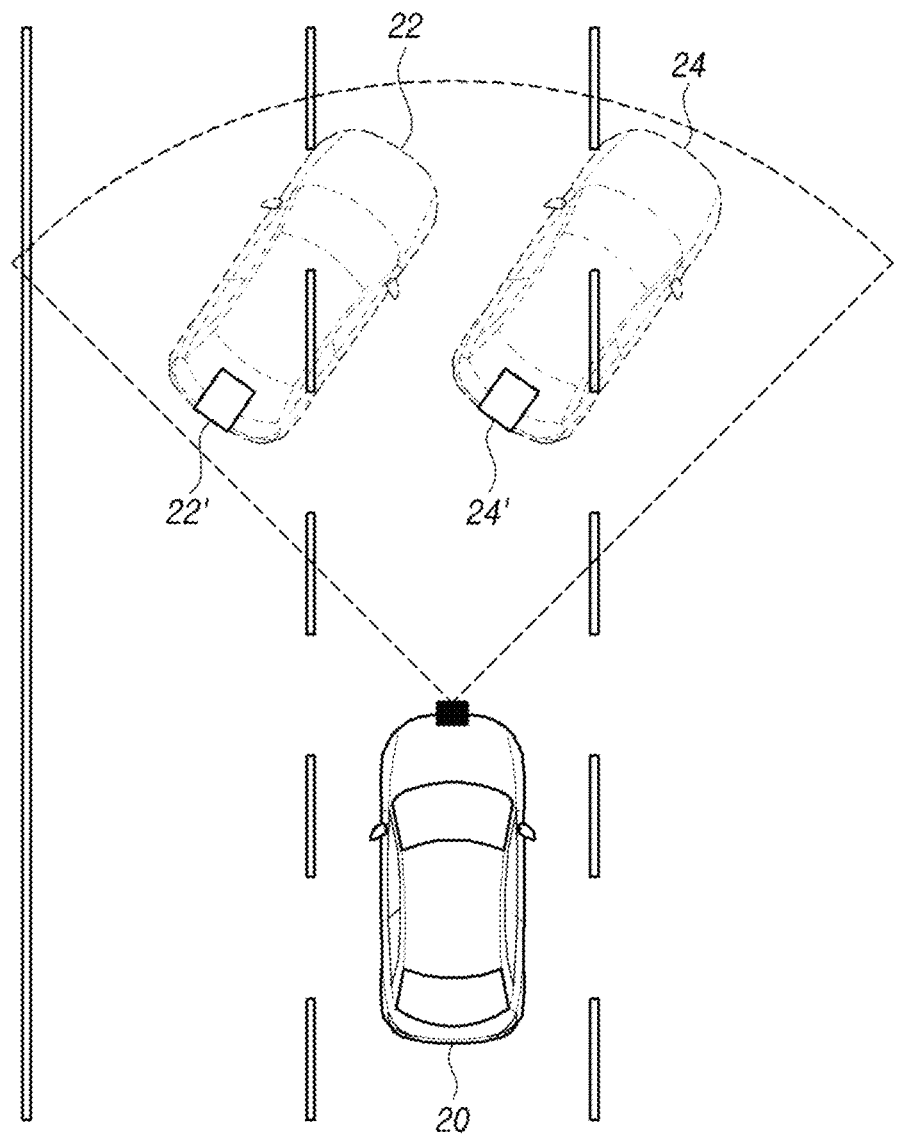
FIG. 2 illustrates an example of detecting a cut-in/cut-out vehicle ahead by a radar device.
Figure 3:
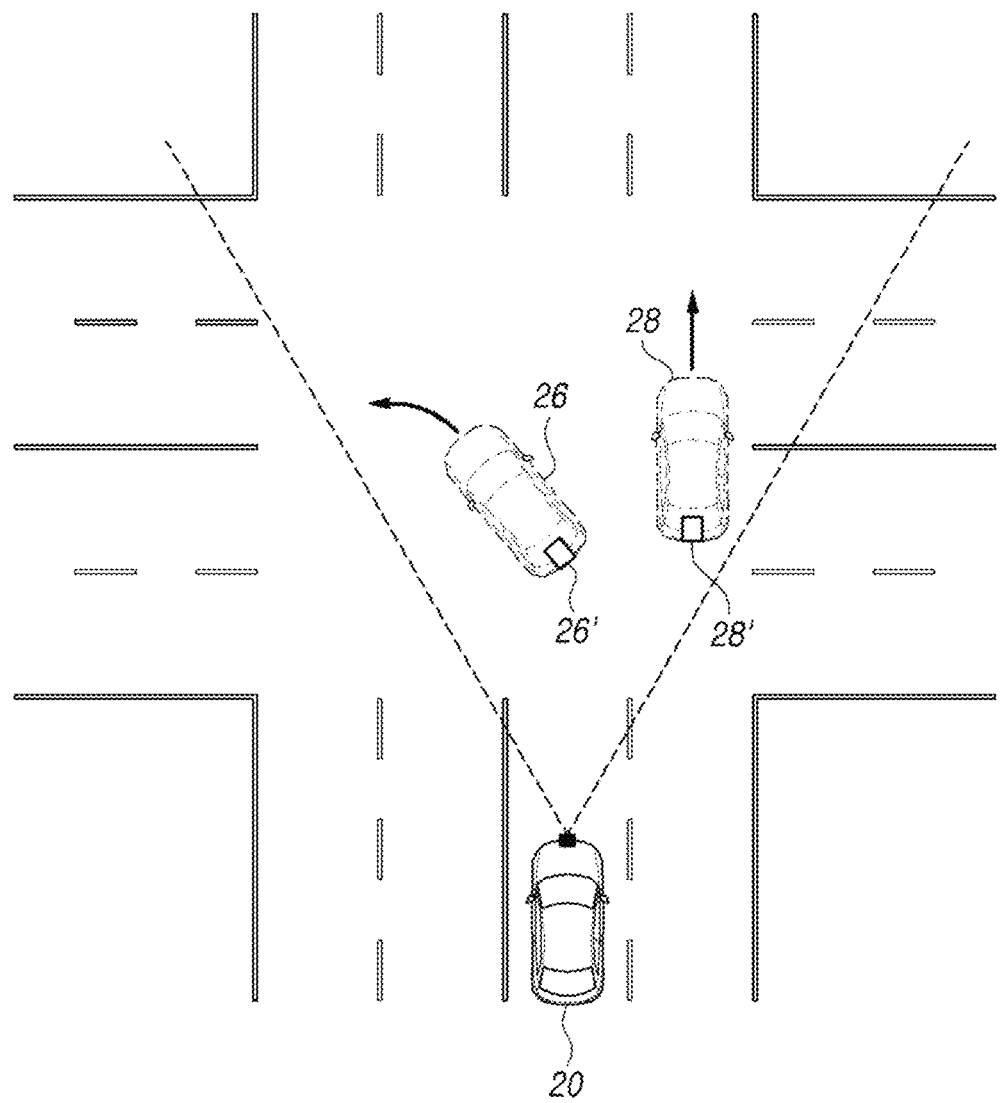
FIG. 3 illustrates an example of detecting other several vehicles ahead by a radar device at an intersection.

FIGS. 2 and 3 illustrate an example of limited obtaining of lateral direction information about a target using a radar device.

FIG. 2 illustrates an example of detecting a cut-in/cut-out vehicle ahead by a radar device.

Referring to FIG. 2, in a state in which the host vehicle 20 travels in the driving lane, a first vehicle 22 ahead cuts in to the driving lane from an adjacent lane or a second vehicle 24 cuts out of the driving lane to an adjacent lane.

In this case, information (distance and azimuth) about a first location 22' of the first vehicle 22 or information about a second location 24' of the second vehicle 24 may be obtained using the radar device of the host vehicle.

The first location 22' is a location corresponding to the peak signal having the largest power spectrum among the reception signals reflected from the first vehicle 22. The first location 22' may be a specific location on a side or rear surface of the first vehicle 22, not the center of the first vehicle 22.

In FIG. 2, the first vehicle 22 is a vehicle cutting in to the driving lane from the adjacent lane and, when a conventional radar device is used, the first location 22' is recognized as being in the adjacent lane, not in the driving lane.

A Likewise, the second vehicle 24 is a vehicle cutting out of the driving lane of the host vehicle and, when a conventional radar device is used, the second location 24' is recognized as remaining in the driving lane.

Accordingly, it is difficult to precisely control the driving of the host vehicle considering the first vehicle 22 and the second vehicle 24.

For example, if the adaptive cruise system (ACC) which controls to follow the preceding target vehicle is in operation, the host vehicle is controlled, with the second vehicle 24 set as the target vehicle. In the state as shown in FIG. 2, since the second vehicle 24 leaves the driving lane, it should be released from being the target vehicle but, in the state in which only the second location 24' of the second vehicle 24 has been recognized, such release from target vehicle is difficult.

As such, use of such a conventional radar device provides only information about some locations of the target and is incapable of accurate driving control for the host vehicle.

FIG. 3 illustrates an example of detecting other several vehicles ahead by a radar device at an intersection.

FIG. 3 illustrates an example in which a third vehicle 26 on the driving lane of the host vehicle 20 turns left, and a fourth vehicle 28 on a lane next to the driving lane of the host vehicle 20 travels straight at an intersection.

In this case, use of the radar device of the host vehicle may provide only distance and azimuth information about a specific third location 26', such as a rear side surface of the third vehicle 26.

Although the third vehicle 26 turns left at the intersection and leaves the driving lane of the host vehicle, the third location 26' is continuously recognized as being in the driving lane, so that it is difficult to precisely predict the behavior of the third vehicle 26.

Therefore, control of the host vehicle based on the behavior of the third vehicle 26 may be limited.

If it is possible to obtain size information, such as the length or width of the target using the vehicle radar device, the behavior of the target may be precisely predicted in the environment shown in FIGS. 2 and 3.

Accordingly, the present embodiments propose an effective method for obtaining size information about a target by vehicle radar.

Figure 4:
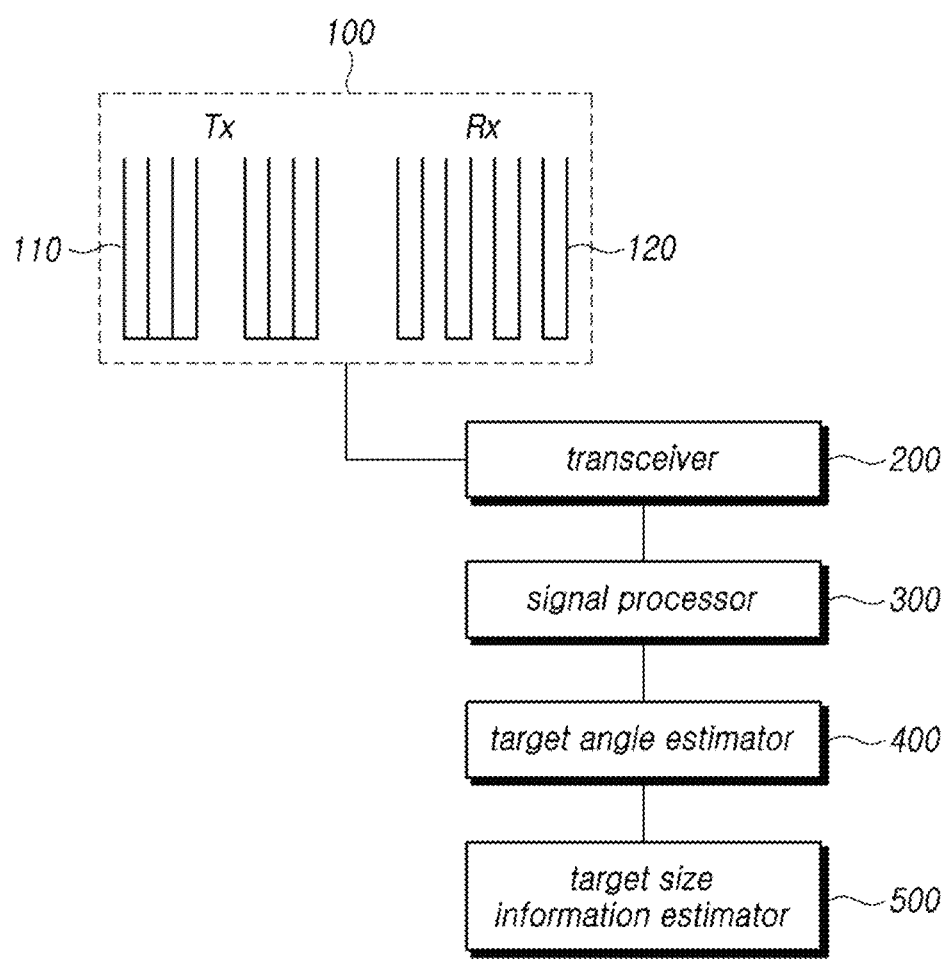
FIG. 4 is a view illustrating a configuration of a vehicle radar device according to the present embodiments.

FIG. 4 is a view illustrating a configuration of a vehicle radar device according to the present embodiments.

Referring to FIG. 4, according to the present embodiments, a vehicle radar device may include an antenna unit 100, a transceiver 200, a signal processor 300, a target angle estimator 400, and a target size information estimator 500.

The antenna unit 100 may include Nt (Nt is a natural number larger than or equal to 1) transmission antennas 110 and Nr (Nr is a natural number larger than or equal to 2) reception antennas.

The transceiver 200 may transmit a transmission signal from a transmission antenna and may control the reception antenna to receive the reception signal reflected from the target.

The signal processor 300 may Fourier-transform the reception signal to detect one or more peak signals for the target and separate and detect Nt*Nr channel reception signals corresponding to each peak signal.

The target angle estimator 400 may perform a function of calculating a target angle estimate from k channel reception signals selected from among Nt*Nr channel reception signals.

The target size information estimator 500 may calculate the size information about the target based on up to $_{Nt*Nr}C_k$ target angle estimates for each peak signal.

A detailed configuration of each component constituting the radar device according to the present embodiments is described below.

The antenna unit 100 may include Nt (Nt is a natural number larger than or equal to 1) transmission antennas 110 and Nr (Nr is a natural number larger than or equal to 2) reception antennas 120.

In other words, the antenna unit 100 used in the radar device according to the present embodiments may be a single-input multi-output (SIMO) antenna or a multi-input multi-output (MIMO) antenna.

A detailed configuration of the antenna unit 100 is described below in more detail with reference to FIGS. 5 and 6.

The transceiver 200 of the radar device according to the present embodiments may transmit transmission signals through the Nt transmission antennas.

In this case, in the case of a MIMO antenna in which Nt is 2 or more, a different transmission signal may be transmitted through each transmission antenna.

A plurality of transmission signals transmitted through a plurality of transmission antennas may have orthogonality with each other.

The orthogonality of the transmission signals may be implemented using one of time division multiplexing (TDM), code division multiplexing (CDM), and frequency division multiplexing (FDM).

For example, when code division multiplexing is used, a first transmission signal and a second transmission signal, respectively, may be modulated using first and second codes orthogonal to each other.

The transceiver 200 may receive the reflection signals reflected by the target, through the Nr reception antennas.

As such, in the radar device according to the present embodiments, Nr transmission signals are transmitted, and Nr reception signals are received in which case a combination of one transmission signal and one reception signal may be defined as a channel.

Alternatively, one reception signal corresponding to one transmission signal may be defined as a channel reception signal.

For example, a first transmission antenna Tx1 and a first reception antenna Rx1 may be defined as a first channel CH1. In this case, the first transmission signal transmitted through the first transmission antenna may be reflected from the target and received by the first reception antenna Rx, and it may be defined as a first reception signal or a first channel reception signal.

Resultantly, in the radar device according to the present embodiment, a total of Nt*Nr channels may be configured, and Nt distinct transmission signals are transmitted, and Nr reception signals are received. Accordingly, a total of Nt*Nr channel reception signals are received.

The transceiver 200 of the radar device according to the present embodiments may further include a transmitter and a receiver. The transmitter includes an oscillator that supplies a signal to each transmission antenna to generate a transmission signal. The oscillator may include, e.g., a voltage-controlled oscillator (VCO) and an oscillator.

The receiver included in the transceiver 200 may include, e.g., a low noise amplifier (LNA) that low-noise amplifies the reflected signal, which is received through a reception antenna, a mixer that mixes the low-noise amplified reception signal, an amplifier that amplifies the mixed reception signal, and an analog-digital converter (ADC) that converts the amplified reception signal into a digital signal to thereby generate reception data.

The signal processor 300 of the radar device according to the present embodiments may Fourier-transform the reception signal received through the reception antenna to detect one or more peak signals for the target and separate and detect Nt*Nr channel reception signals corresponding to each peak signal.

Each peak signal may be a signal peak having a power spectrum of a predetermined level or higher among the reception signals reflected from the target and received.

Each peak signal may include a predetermined frequency component, and the range R to the target may be determined by the frequency component.

The transmission signal may include a plurality of fast chirped signals. The signal processor 300 may obtain a time component according to the range by performing a first Fourier transform (1st FFT) on the reception signal and may generate a range-Doppler map, which represents speed information according to the range, by performing a second Fourier transform (2nd FFT).

A specific configuration in which the signal processor 300 generates a range-Doppler map from the reception signal and detects the peak signal therefrom is described below in greater detail with reference to FIG. 7.

The signal processor 300 may detect a plurality of peak signals based on the reception signals reflected from a specific location of the target, using the range-Doppler map.

The signal processor 300 may separately detect Nt*Nr channel reception signals corresponding to each peak signal. One or more transmission signals are distinguished while having orthogonality, and the plurality of reception antennas are also distinguished in arrangement, and thus, the signal processor 300 may separately detect the Nt*Nr channel reception signals corresponding to each peak signal.

Further, the signal processor 300 may allocate a range-range index for each detection period to each peak signal and distinguish the Nt*Nr channel reception signal groups corresponding to each peak signal based on the range-speed index.

The signal processor 300 of the radar device according to the present embodiments may include a first processor and a second processor for signal processing. The first processor may be a pre-processor for the second processor and may obtain transmission data and reception data, control the oscillator to generate a transmission signal based on the obtained transmission data, synchronize the transmission data and the reception data, and frequency-transform the transmission data and the reception data.

The second processor may be a post-processor that performs substantial processing using the result of processing by the first processor and may perform constant false alarm rate (CFAR) computation, tracking computation, and target selection computation based on the reception data frequency-transformed by the first processor. The second processor may calculate the height information about the target according to the above-described scheme.

The first processor may data-buffer the obtained transmission data and the obtained reception data into unit sample sizes processable per period and then perform frequency transform. As the above-described frequency transform performed by the first processor, a Fourier transform, such as a fast Fourier transform (FFT), may be used.

The second processor may perform a second Fourier transform on the signal first Fourier transformed (FFT) by the first processor, and the second Fourier transform may be, e.g., a discrete Fourier transform (hereinafter, referred to as "DFT"). The second Fourier transform may be the chirp-DFT among the DFTs.

The second processor may obtain a number of frequency values corresponding to the second Fourier transform length K through the second Fourier transform, such as chirp-DFT, calculate the bit frequency having the largest power during each chirp period based on the obtained frequency values, and obtain speed information and distance information about the object based on the calculated bit frequency, thereby detecting the object.

The signal processor 300 may be referred to by other terms, such as a controller, and may be implemented in the form of a digital signal processor (DSP).

Radar sensor devices may be classified into pulsed, frequency modulation continuous wave (FMCW), and frequency shift keying (FSK) types depending on the type of signal used.

Among them, the FMCW-type radar uses a chirp signal or a ramp signal, which is a signal whose frequency increases over time, and computes information about the target using the time difference between the transmission wave and reception wave and the Doppler frequency shift.

In the disclosure, the frequency modulation continuous wave (FMCW)-type radar device using the fast chirp signal is exemplified, but embodiments are not limited thereto.

The target angle estimator 400 may calculate a target angle estimate ($\hat{\theta}$) from k channel reception signals selected from among Nt*Nr channel reception signals corresponding to a specific peak signal.

Described below is an example in which when k is 2, the target angle estimator 400 calculates the target angle estimate ($\hat{\theta}$).

The target angle estimator 400 may calculate the target angle estimate ($\widehat{\theta_{ij}}$) based on the distance difference $dn_{ij}$ and phase difference $\varphi ij$ between the selected i-channel reception signal and the j-channel reception signal.

In other words, the target angle estimator 400 calculates the i-jth target angle estimate ($\widehat{\theta_{ij}}$) based on the distance difference and phase difference between the channel reception signals for two channels i and j selected from among the Nt*Nr channel reception signals corresponding to a specific peak signal.

Specifically, the i-jth target angle estimate ($\widehat{\theta_{ij}}$) may be calculated by Equation 1 below.

$$\hat{\theta}_{ij} = \arcsin\left(\frac{\phi_{ij} \times \lambda}{2\pi \times dn_{ij}}\right) \quad \text{[Equation 1]}$$

($\hat{\theta}$: estimated target angle)

In Equation 1, $\lambda$ is the wavelength corresponding to the frequency component of the corresponding peak signal. In Equation 1, the distance difference $dn_{ij}$ between the i-channel reception signal and the j-channel reception signal is the spacing between the i-channel reception antenna and the j-channel reception antenna.

In a similar manner, the target angle estimator 400 may calculate the l-mth target angle estimate θlm based on the distance difference and phase difference between the channel reception signals for two channels 1 and m selected from among the Nt*Nr channel reception signals corresponding to a specific peak signal.

Resultantly, the target angle estimator 400 may calculate target angle estimates from the Nt*Nr channel reception signals corresponding to a specific peak signal. In this case, if a combination operation for selecting two from among Nt*Nr is used, $_{Nt*Nr}C_2$ target angle estimates may be obtained.

Each of the so-obtained, up to $_{Nt*Nr}C_2$ target angle estimates may include information about the lateral locations for the plurality of locations of the target corresponding to the corresponding peak signal. The azimuth information about the target may be obtained using the lateral location information about the target.

Further, the range R to the target may be determined using the frequency component of each peak signal, and a plurality of target locations within the same range may be determined by up to $_{Nt*Nr}C_2$ target angle estimates.

Accordingly, a plurality of pieces of target location information may be obtained by the plurality of angle estimates and one range for each peak signal.

The target size information estimator 500 may obtain size information about the target using such multiple pieces of target location information.

The target angle estimator 400 may use an algorithm different from the above-described scheme to calculate a target angle estimate ($\hat{\theta}$) from k channel reception signals selected from among Nt*Nr channel reception signals corresponding to a specific peak signal.

For example, the target angle estimate ($\hat{\theta}$) may be calculated using, e.g., a multiple signal classification (MUSIC) algorithm, an estimation of signal parameters via rotational invariance technique (ESPRIT) algorithm, or a Bartlett algorithm, based on, e.g., interval between antennas or phase difference between k selected channel reception signals.

The target size information estimator 500 of the radar device according to the present embodiments may calculate the size information about the target based on up to $_{Nt*Nr}C_k$ target angle estimates calculated by the target angle estimator 400 for each peak signal.

In this case, the target size information estimator 500 may calculate the size information about the target based on the target angle estimates during one detection period. Alternatively, the target size information estimator 500 may calculate the size information about the target based on the target angle estimate accumulated during two or more detection periods.

In this case, the detection period means a unit time for signal transmission/reception for target detection, and may be referred to as a frame period or a scan period.

For each peak signal, multiple pieces of target location information may be obtained by multiple angle estimates and one range, and the target size information estimator 500 may merge multiple pieces of target location information for the same target to thereby obtain target size information about, e.g., the shape, length, or width of the target.

A specific configuration in which the target size estimator 500 obtains target size information based on a plurality of target angle estimates is described below in more detail with reference to FIG. 9.

As described above, if the radar device according to the present embodiments is used, target angle estimates may be calculated from k channel reception signals selected from among a plurality of channel reception signals corresponding to each peak signal, and size information about the target may be exactly estimated based on up to $_{Nt*Nr}C_2$ target angle estimates thus calculated.

Accordingly, it is possible to precisely detect length and width information about the target, as compared with the conventional radar device capable of obtaining only azimuth information about a specific location of the target.

As such, it is possible to enhance the detection performance of radar and the control performance of the host vehicle by controlling the host vehicle considering even the target size information.

FIGS. 5, 6, 7, and 8 illustrate an example of an antenna unit of a radar device according to the present embodiments.

The antenna unit 100 used in the radar device according to the present embodiments may include Nt (Nt is a natural number larger than or equal to 1) transmission antennas and Nr (Nr is a natural number larger than or equal to 2) reception antennas.

Figure 5:
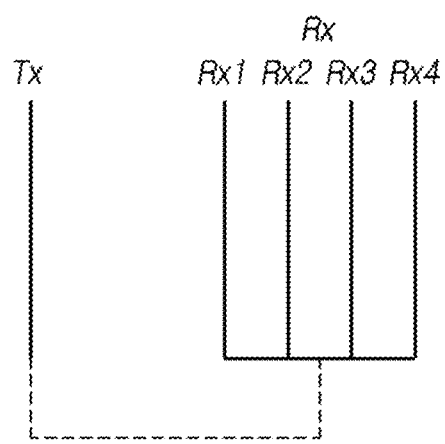
FIGS. 5, 6, 7, and 8 illustrate an example of an antenna unit of a radar device according to the present embodiments.
Figure 6:
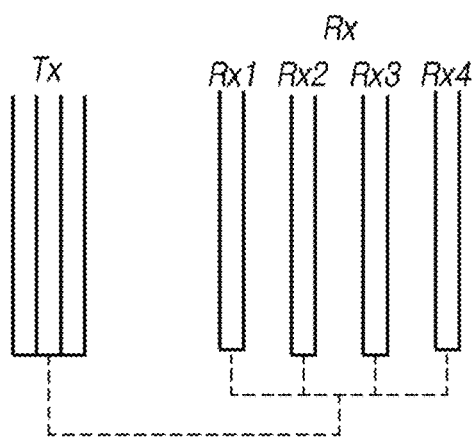
Figure 7:
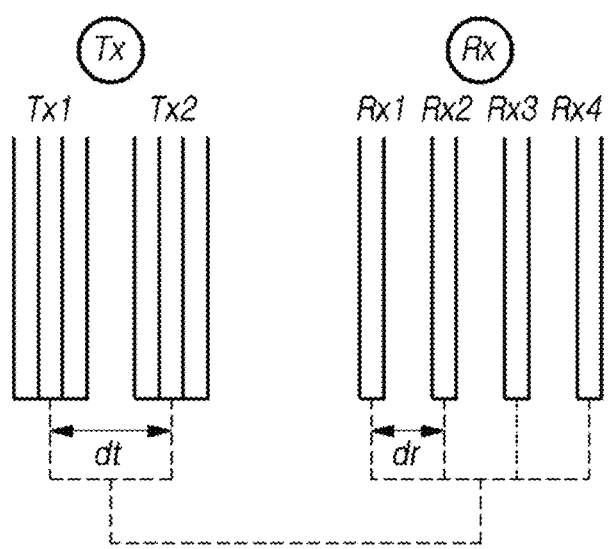
Figure 8:
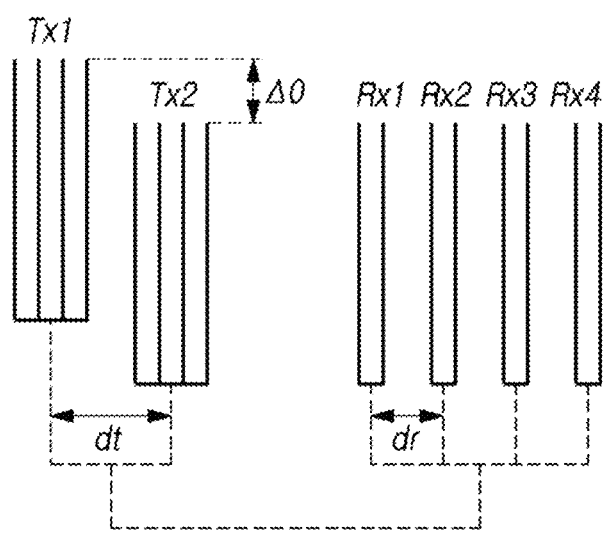

FIGS. 5 and 6 illustrate an example in which Nt is 1, and Nr is 4, and FIGS. 7 and 8 illustrate an example in which Nt is 2, and Nr is 4.

According to the embodiment of FIGS. 5 and 6, the antenna unit 100 may include one transmission antenna Tx and four reception antennas Rx1 to Rx4.

The transmission antenna Tx and the four reception antennas Rx1 to Rx4 may be disposed in the same position in the vertical direction.

FIG. 6 illustrates an example in which each of a transmission antenna and a reception antenna is composed of two array antennas.

FIG. 7 illustrates an example in which the transmission antenna Tx is composed of four array antennas, and each reception antenna is composed of two array antennas.

In other words, each of the transmission antenna or the reception antenna may have a structure in which two, four, or six array antennas extend to one side while having one feeding point, but embodiments are not limited thereto.

In this case, each array antenna constituting the transmission antenna and the reception antenna may be configured of a plurality of elements or patches connected to the output line of the distributor and may extend upwards (the upper direction among the vertical directions) from the input port of the distributor or the feeding port connected to the chip including a controller.

The embodiment of FIGS. 5 and 6 may be represented as a single-input multi-output (SIMO) structure.

Referring to FIG. 7, the antenna unit 100 may include two transmission antennas Tx1 and Tx2 and four reception antennas Rx, and the two transmission antennas Tx1 and Tx2 may be spaced apart by a predetermined horizontal distance dt in the horizontal direction. The four reception antennas Rx1 to Rx4 may be spaced apart by a predetermined horizontal distance dr while having the same vertical location as the transmission antennas.

In this case, the horizontal distances dt and dr may be ½ (0.5λ) of the transmission signal wavelength. It is possible to remove angle ambiguity caused by the grating lobe by setting the horizontal distances dt and dr to ½ (0.5λ) of the transmission signal wavelength.

In other words, since the distance between the reception antennas is not less than ½ (0.5λ) of the transmission signal wavelength, a grating lobe may occur. The angle ambiguity caused by the grating lobe may be minimized by arranging the reception antennas so that the horizontal distance therebetween is 0.5λ and comparing the pieces of angle information extracted from the respective channels of the reception antennas and performing compensation.

As in FIGS. 5 and 6, each of the transmission antenna and the reception antenna may have a structure in which two, four, or six array antennas extend to one side while having one feeding point, but embodiments are not limited thereto.

According to the embodiment of FIGS. 7 and 8, different transmission signals having orthogonality are transmitted from two transmission antennas. The reception signals reflected by the target are received by four reception antennas. Accordingly, a total of 2*4=8 channel reception signals may be distinguished and detected.

According to the embodiment of FIG. 8, the antenna unit 100 may include two transmission antennas Tx1 and Tx2 and four reception antennas Rx, and the two transmission antennas Tx1 and Tx2 may be spaced apart by a predetermined offset distance ΔO in the vertical direction, and the plurality of reception antennas Rx all may have the same vertical location.

The two transmission antennas Tx1 and Tx2 constituting the transmission antenna unit may be spaced apart by the horizontal distance dt in the horizontal direction perpendicular to the extending direction of each array antenna. In this case, the horizontal distance dt may be ½ (0.5λ) of the transmission signal wavelength.

In this case, the four reception antennas Rx1 to Rx4 constituting the reception antenna unit may also be spaced apart by the horizontal distance dr in the horizontal direction.

Since the transmission antennas Tx1 and Tx2 are offset by the offset distance ΔO in the vertical direction as shown in FIG. 8, a phase difference according to the vertical offset may occur between the first reception signal transmitted from Tx1 and received by the reception antenna and the second reception signal transmitted from Tx2 and received by the reception antenna.

Further, the first transmission signal and the second transmission signal having orthogonality to each other may simultaneously be transmitted through the first transmission antenna TX1 and the second transmission antenna TX2.

Accordingly, the target distance to the target may be calculated using the time difference between the transmission time and the reception time, and horizontal information or vertical information about the target may be calculated using the phase differences between the first transmission signal, the second transmission signal, the first reception signal, and the second reception signal.

In particular, according to the embodiment of FIG. 8, it is possible to obtain vertical direction information, such as the angle of elevation or height information about the target, by arranging the transmission antennas or reception antennas among the MIMO antennas to be offset and using different transmission signals.

In the radar device according to the present embodiments, the radar signals transmitted/received through the transmission antennas or reception antennas offset in the horizontal direction may be modulated in different modulation schemes and be used.

The radar device according to the present embodiments may have a reception array structure in which the reception end has a plurality of virtual reception antennas, as well as a plurality of actual reception antennas, due to a virtual reception antenna former.

As such, the antenna structure which further includes a plurality of virtual reception antennas at the reception end may be referred to as an "antenna structure having a virtual aperture structure."

For example, in the antenna structure of FIGS. 7 and 8, a first transmission signal and a second transmission signal having orthogonality to each other are simultaneously transmitted through the first transmission antenna TX1 and the second transmission antenna TX2 during a predetermined detection period (e.g., frame).

Since the first transmission antenna TX1 and the second transmission antenna TX2, which respectively transmit the first transmission signal and the second transmission signal, are spaced apart from each other by dt in the horizontal direction, the reception antenna which receives the reflection signal reflected by the target has the same effect as if the first transmission signal and the second transmission signal are shifted by dt in the horizontal direction and received.

In this case, as a concept distinguished from the reception antenna actually present, the reception antenna which is caused to virtually exist by the horizontal and vertical spacing of the transmission antennas simultaneously transmitting signals may be referred to as a virtual reception antenna.

The size of the aperture of the reception antenna may be defined as the distance between the reception antennas disposed at two opposite ends of the reception side.

If such a virtual reception antenna is used, the size of the antenna aperture of the reception side may be increased, and the detection resolution may thereby be enhanced.

Figure 9:
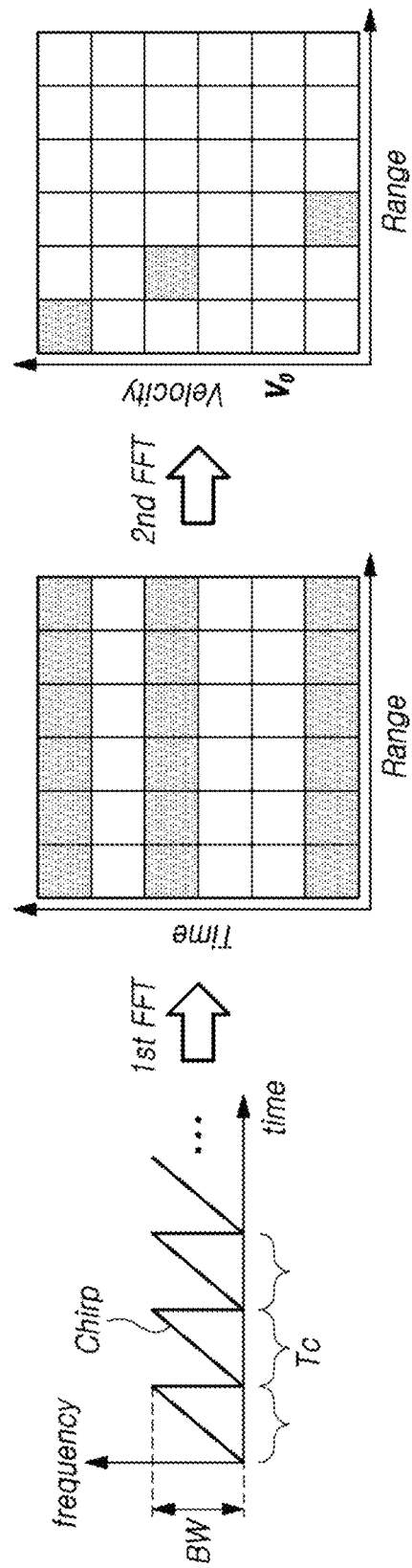
FIG. 9 illustrates a principle of obtaining range-speed information about a target by a radar device according to the present embodiments.

FIG. 9 illustrates a principle of obtaining range-speed information about a target by a radar device according to the present embodiments.

Referring to FIG. 9, a radar device according to the present embodiments may obtain a time component according to the distance by performing a first Fourier transform (1st FFT) on the reception signal for a fast time and compress the signal present at each distance according to the speed by performing a second Fourier transform (2nd FFT) for a slow time, thereby calculating range-speed information about the target.

More specifically, as shown on the left of FIG. 9, the signal processor 300 may perform the first Fourier transform (1st FFT), which is a fast Fourier transform, on the radar reception signal including a fast ramp or a fast chirp, thereby obtaining a range-time graph which is the time component according to the range.

Next, the signal processor 300 may perform a second Fourier transform, which is a second Fourier transform, on the time component according to the range, thereby obtaining range-speed domain information which represents the speed information according to the range as shown on the right of FIG. 3. The range-speed domain information may also be denoted as a range-Doppler map.

For example, as shown in FIG. 9, if a 2D Fourier transform (FFT) is performed on the composite signal of the reception signal and the transmission signal, three grating areas may be shown, as target areas, on the range-Doppler map.

Each target area detected from the range-Doppler map may be detected as a peak signal. Each detected peak signal may include a frequency component of the corresponding target area, and the distance to the target corresponding to each peak signal may be calculated using the frequency component.

All of the Nt*Nr channel reception signals are mixed, and each peak signal is detected from the range-Doppler map. In other words, Nt*Nr channel reception signals corresponding to each peak signal exist.

The signal processor 300 according to the present embodiments separately detect the Nt*Nr channel reception signals corresponding to each peak signal.

A configuration of measuring the range R to the target using the frequency component corresponding to each peak signal is as follows.

The transmission wave and the reception wave to generate each peak signal have the same form and has predetermined shifts on the time axis and frequency axis.

The distance to the target and relative speed may be calculated using the time difference between the transmission wave and the reception wave or the frequency shift.

More specifically, a beat signal is generated by mixing (i.e., convolution) the transmission wave and the reception wave, and the beat signal has a sine waveform with a constant beat frequency fb.

In this case, the beat frequency fb of the beat signal has a value proportional to the range R to the target. Specifically, the range R to the target may be determined by Equation 2 below.

$$R = \frac{fb \cdot T \cdot c}{2 \cdot BW} \qquad \text{[Equation 2]}$$

In Equation 2, BW denotes the frequency bandwidth of the transmission wave/reception wave, T denotes the sweep time that is the time occupied by one waveform, c denotes the speed of light, and fb denotes the beat frequency of the beat signal.

As such, the signal processor 300 may calculate the range R to the target using the frequency component included in each peak signal detected from the range-Doppler map.

Figure 10:
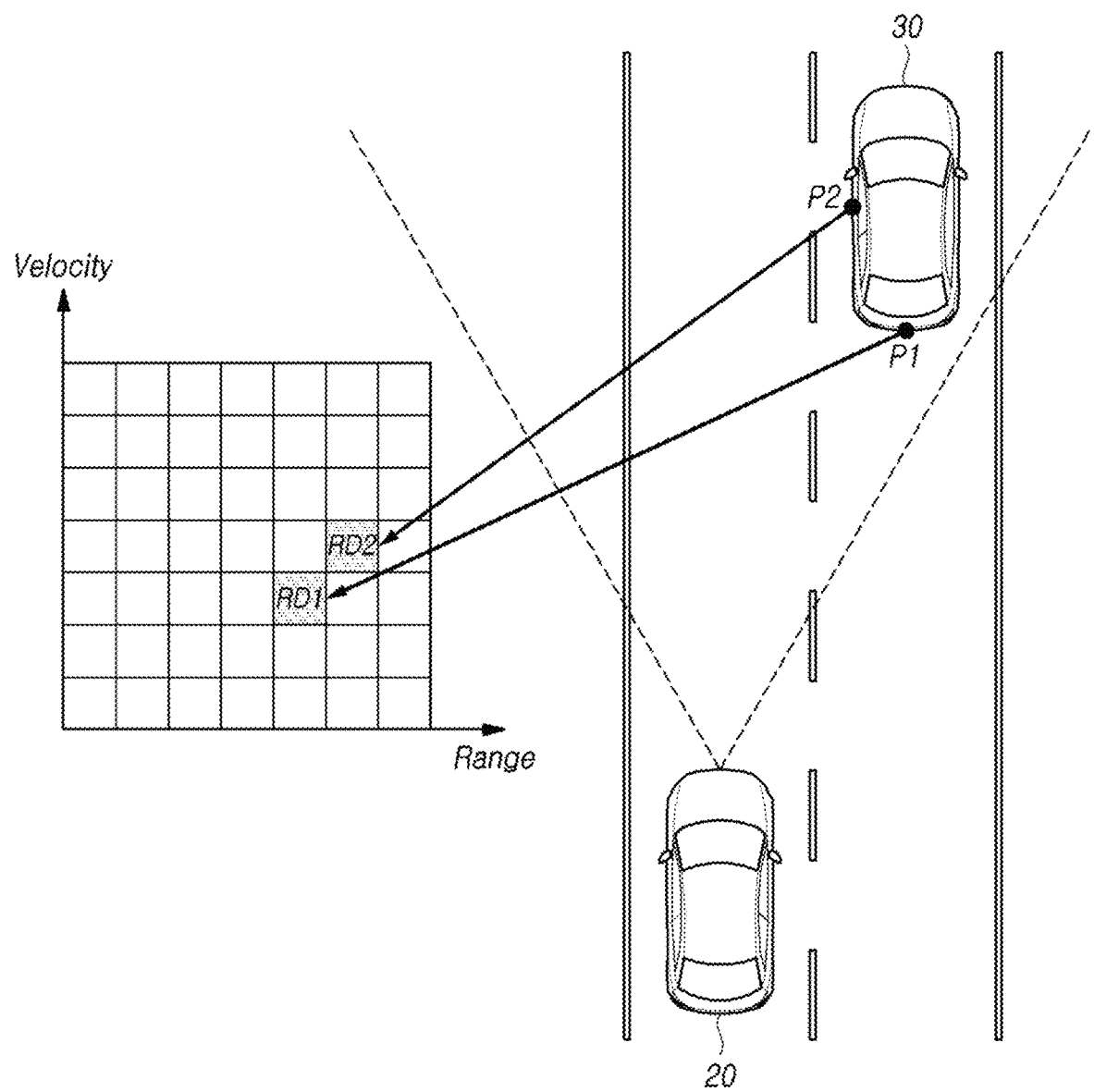
FIG. 10 illustrates a principle of extracting multiple peak signals (target frequencies) from a range-speed map by a signal processor according to the present embodiments.

FIG. 10 illustrates a principle of extracting multiple peak signals (target frequencies) from a range-speed map by a signal processor according to the present embodiments.

As illustrated in FIG. 9, it is possible to determine multiple peak signal areas (target areas) from the range-Doppler map by 2D FFT processing the reception signal during a predetermined detection period.

Referring to FIG. 10, the reception signal received during a specific detection period is subjected to 2D FFT processing, so that two target areas (peak signal areas) RD1 and RD2 are detected from the range-Doppler map.

The target area RD1 may correspond to a first position P1 at the rear of another vehicle 30 which is the target, and the target area RD2 may correspond to a second position P2 on a side of the other vehicle which is the target.

Each of the target areas RD1 and RD2 may have a corresponding peak signal and frequency component, and the signal processor 300 may calculate the distances to the first position P1 and the second position P2 of the target in the radar device, by using the frequency component of the peak signal.

Further, the signal processor 300 separately detects a total of Nt*Nr channel reception signals from the peak signal of each target area RD1 and RD2. In other words, the signal processor 300 separately detects each of the Nt*Nr channel reception signals constituting each peak signal using different transmission signals having orthogonality and different placements of the plurality of reception antennas.

Figure 11:
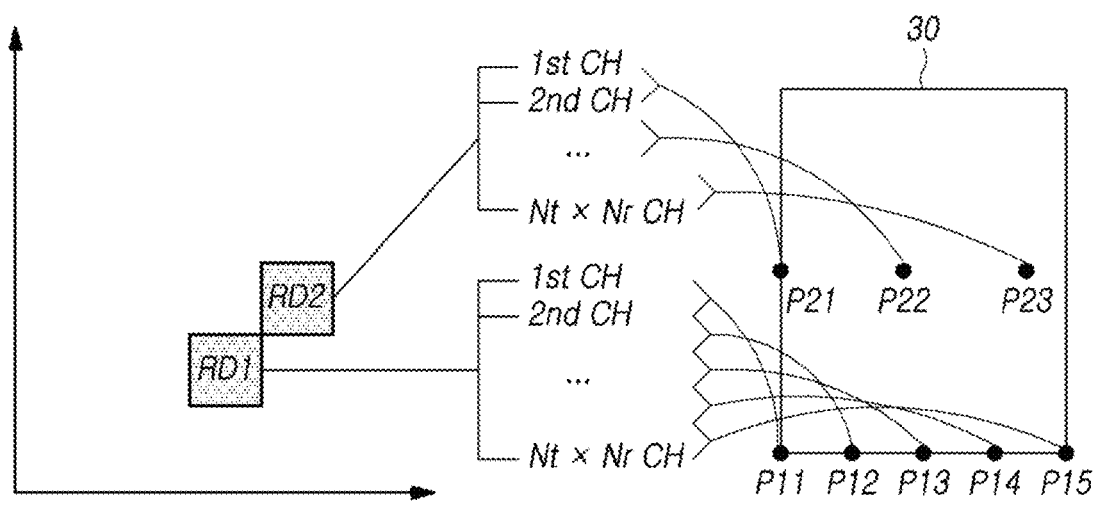
FIGS. 11 and 12 illustrate a configuration in which a radar device determines a plurality of target angle estimates (target points) from a plurality of channel reception signals corresponding to each peak signal according to the present embodiments.
Figure 12:
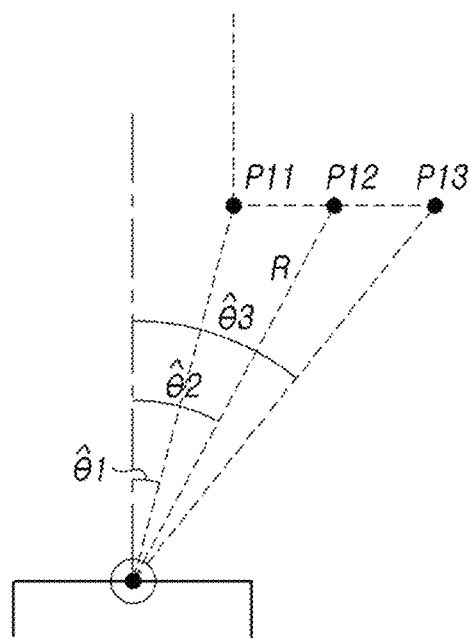

FIGS. 11 and 12 illustrate a configuration in which a radar device determines a plurality of target angle estimates (target points) from a plurality of channel reception signals corresponding to each peak according to the present embodiments.

As shown in FIG. 10, a plurality of peak signal areas (target areas) are detected from the range-Doppler map by 2D FFT processing the reception signal received during a specific detection period.

Further, each of the Nt*Nr channel reception signals constituting each peak signal is separately detected.

In FIGS. 11 to 14, the ith channel reception signal among the Nt*Nr channel reception signals is denoted as ith CH.

The target angle estimator 400 according to the present embodiments may select k channel reception signals from among the Nt*Nr channel reception signals and calculates the target angle estimate by the k selected reception signals.

In FIGS. 11 and 12, k is assumed to be 2. For example, the target angle estimator 400 may calculate the first target angle estimate ($\hat{\theta}1$) using the first channel reception signal 1st CH and the second channel reception signal 2nd CH among the Nt*Nr channel reception signals included in the first peak signal RD1. Further, the target angle estimator 400 may calculate the second target angle estimate ($\overline{\theta 2}$) using the second channel reception signal 2nd CH and the third channel reception signal 3rd CH. The target angle estimator 400 may calculate the third target angle estimate ($\hat{\theta}3$) using the third channel reception signal 3rd CH and the fourth channel reception signal 4th CH.

Further, the target angle estimator 400 may randomly select two channel reception signals from among the Nt*Nr channel reception signals included in the second peak signal RD2 and calculate a plurality of target angle estimates ($\hat{\theta}$) for the second peak signal.

In this case, RD1 and RD2 may be range-speed indexes in the corresponding detection period. The corresponding peak signals and Nt*Nr channel reception signals may be distinguished by the range-speed indexes.

As described above, since the target range R corresponding to the corresponding peak signal is calculated using the frequency component of each peak signal, a plurality of target positions (target points) may be determined by the plurality of target angle estimates calculated for each peak signal.

As shown in FIG. 11, five target angle estimates may be determined for the first peak signal RD1, so that five target points P11, P12, P13, P14, and P15 may be determined. Further, for the second peak signal RD2, three target angle estimates may be determined, so that three target points P21, P22, and P23 may be determined.

If three target angle estimates $\hat{\theta}1, \hat{\theta}2, \hat{\theta}3$ are calculated for one peak signal as shown in FIG. 12, three target points P11, P12, and P13 may be determined by the target range R corresponding to the already determined peak signal.

As shown in FIGS. 10 and 11, a plurality of target points corresponding to one peak signal may be determined, and size information, such as the shape, length, or width of the target, may be obtained by connecting the target points.

For example, the width of the target may be determined by the distance between target points P11 and P15 for the first peak signal in FIG. 11.

In the embodiment of FIGS. 11 and 12, the target angle estimate and target size information are obtained using only the reception signals received during one detection period but, in some cases, the target angle estimate and target size information may be obtained by accumulating the reception signals received during a plurality of detection periods.

Figure 13:
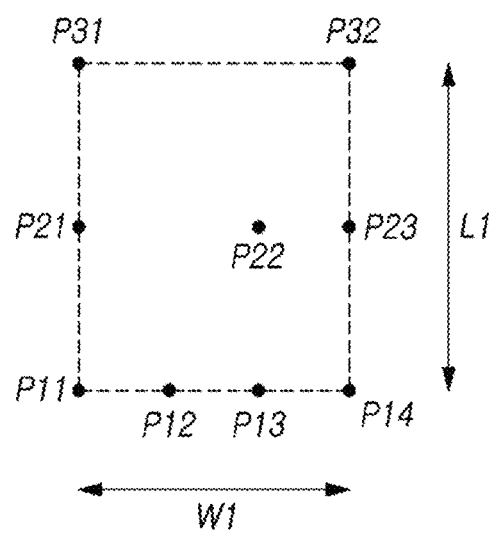
FIGS. 13 and 14 illustrate a configuration in which a radar device determines a plurality of target angle estimates (target points) in one or more detection periods according to the present embodiments.
Figure 14:
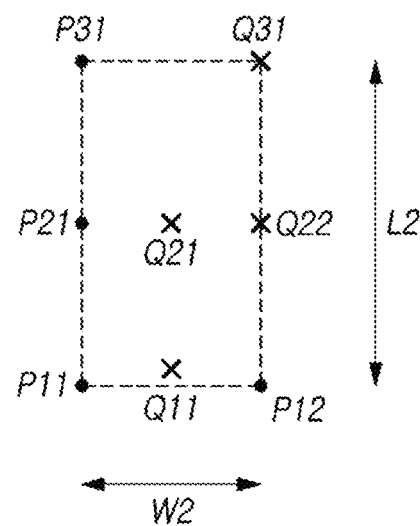

FIGS. 13 and 14 illustrate a configuration in which a radar device determines a plurality of target angle estimates (target points) in one or more detection periods according to the present embodiments.

FIG. 13 illustrates an example in which during one detection period, four target points P11 to P14 corresponding to a first peak signal are determine, three target points P21 to P23 corresponding to a second peak signal are determined, and two target points P31 and P32 corresponding to a third peak signal are determined.

The target size information estimator 500 may determine the length L1 and the width W1 of the target based on the nine target points determined for three peak signals. For example, in FIG. 13, the length L1 of the target may be determined by the distance between the target points P11 and P31, and the width W1 of the target may be determined by the distance between the target points P11 and P14.

FIG. 14 illustrates an example of estimating target detection angles and determining target points cumulatively during two detection periods.

For example, during a first detection period, two target points P11 and P12 corresponding to a first peak signal may be determined, one target point P21 corresponding to a second peak signal may be determined, and one target point P31 corresponding to a third peak signal may be determined.

During the successive second detection period, one target point Q11 corresponding to the first peak signal may be determined, two target points Q21 and Q22 corresponding to the second peak signal may be determined, and one target point Q31 corresponding to the third peak signal may be determined.

The target size information estimator 500 may determine the length and the width of the target using the eight target points determined for the three peak signals during the two detection periods. For example, in FIG. 14, the length L2 of the target may be determined by the distance between the target points P12 and Q31, and the width W2 of the target may be determined by the distance between the target points P31 and Q31.

In this case, the detection period means a signal processing time unit or time cycle for signal transmission/reception and information acquisition, and may be referred to as a frame period or a scan period. In general, the frame period of the vehicle radar device may be 50 ms or less or 100 ms or less, but is not limited thereto.

It may be impossible to precisely estimate the size of the target only with a peak signal and a plurality of target angle estimates corresponding thereto during one detection period.

If peak signals are detected and a plurality of target angle estimates are accumulated during a plurality of detection periods as shown in FIG. 14, it is possible to more precisely determine the size of the target.

In the embodiment of FIG. 14, a configuration for converting the target points detected during a previous detection period into target points corresponding to the current detection period may be added.

For example, when the detection period, i.e., the frame period, is 50 ms, the position Pij of the target point detected during a first frame period may be converted into a position after 50 ms (i.e., a second frame period).

In this case, the target size information estimator 500 may estimate the target size information using the target point Qij detected during the second detection period and the converted target point Pij during the first detection period.

The structure of the antenna unit of the radar device according to the present embodiments is not limited to the configuration shown in FIGS. 5 and 6, and other types of antennas may be used.

Further, the radar device according to the present embodiments may adopt a signal transmission/reception scheme of multiple input multiple output (MIMO) and a multi-dimensional array to form a larger virtual antenna aperture than the actual antenna aperture.

For example, to achieve horizontal and vertical angular precision and resolution, a two-dimensional antenna array is used. If the 2D radar array antenna is used, signals may be transmitted/received by two scans individually (time-multiplexed) horizontally and vertically, and MIMO may be used separately from the 2D radar horizontal and vertical scans (time multiplexing).

Specifically, the radar device according to the present embodiments may adopt a 2D antenna array configuration including a transmission antenna unit including a total of 12 transmission antennas Tx and a reception antenna unit including 16 reception antennas Rx and may resultantly have a total of 192 virtual reception antenna arrays.

In another embodiment, the antenna of the radar device may have a 2D array antenna arrangement and, as an example, each antenna patch may have a Rhombus arrangement to reduce unnecessary side lobes.

Alternatively, the 2D array antenna may have V-shaped array antennas in which a plurality of radiation patches are arranged in a V shape and, specifically, include two V array antennas. In this case, single feed to the apex of each V-shaped antenna array is achieved.

Alternatively, the 2D array antenna may include an X-shaped array antenna in which a plurality of radiation patches are arranged in an X shape and, specifically, include two X-shaped array antennas. In this case, single feed to the center of each X-shaped array antenna is performed.

The radar device according to the present embodiments may use a MIMO antenna system to implement detection accuracy or resolution in the vertical and horizontal directions.

More specifically, in the MIMO system, the transmission antennas may transmit signals having independent waveforms distinguished from each other. In other words, each transmission antenna may transmit an independent waveform of signal distinguished from the other transmission antennas, and each reception antenna may determine what transmission antenna the reflection signal reflected by the object has been transmitted from by the different waveforms of the signals.

Further, the radar sensor according to the present embodiments may include a substrate including a transmission/reception antenna, a radar housing for receiving a circuit, and a radome configuring the appearance of the radar housing. The radome may be formed of a material capable of reducing the attenuation of transmitted/received radar signals, and the radome may be configured of the front/rear bumper of the vehicle, grill, side body of the vehicle, or exterior of a vehicle component.

In other words, the radome of the radar sensor may be placed inside the vehicle grill, bumper, or vehicle body or may be disposed as part of a component constituting the exterior of the vehicle, such as the vehicle grill, bumper, or body, providing for comfortable radar sensor mounting while providing a better appearance.

The radar device or radar system used according to the disclosure may include one or more of at least one radar sensor unit, e.g., a front detection radar sensor mounted on the front of the vehicle, a rear radar sensor mounted on the rear of the vehicle, and side or rear side/rear radar sensor mounted on each side of the vehicle.

The radar sensors or radar system may analyze the transmission signal and reception signal to process data, thereby detecting information for the object. To that end, the radar sensors or radar system may include an electronic control unit (ECU) or a processor. Data transmission or signal communication from the radar sensor to the ECU may use a communication link, such as a suitable vehicle network bus.

Figure 15:
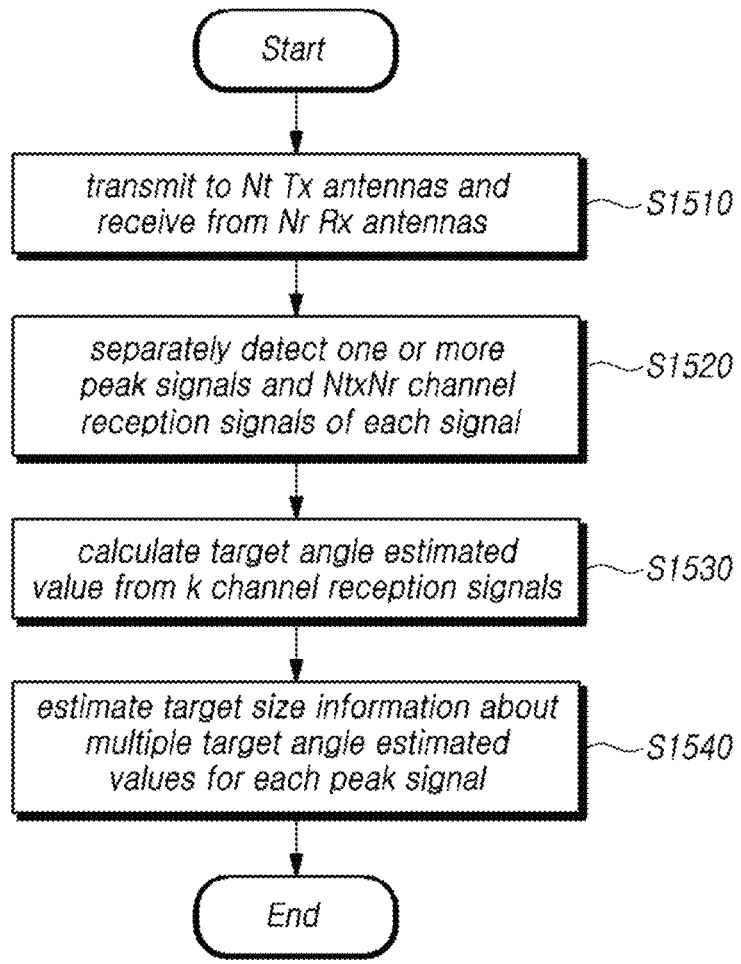
FIG. 15 is a flowchart illustrating an overall radar device control method according to the present embodiments.

FIG. 15 is a flowchart illustrating an overall radar device control method according to the present embodiments.

Referring to FIG. 15, according to the present embodiments, a method for controlling a radar device may include the step S1510 of transmitting transmission signals from Nt (Nt is a natural number of 1 or more) transmission antennas and receiving reception signals from Nt (Nt is a natural number of 1 or more) reflected by a target by Nr (Nr is a natural number of 2 or more) reception antennas.

Further, the method for controlling the radar device may include the step S1520 of processing the reception signals to detect one or more peak signals for the target and separately detecting Nt*Nr channel reception signals corresponding to each peak signal.

Further, the method for controlling the radar device may include the step S1530 of calculating a target angle estimate from k channel reception signals selected from among the Nt*Nr channel reception signals and the step S1540 of calculating size information about the target based on up to $_{Nt*Nr}C_k$ target angle estimates for each peak signal.

Each step of the method for controlling the radar device may be performed using the radar device described in connection with FIGS. 4 to 12, and a description for a specific configuration thereof is omitted.

Figure 16:
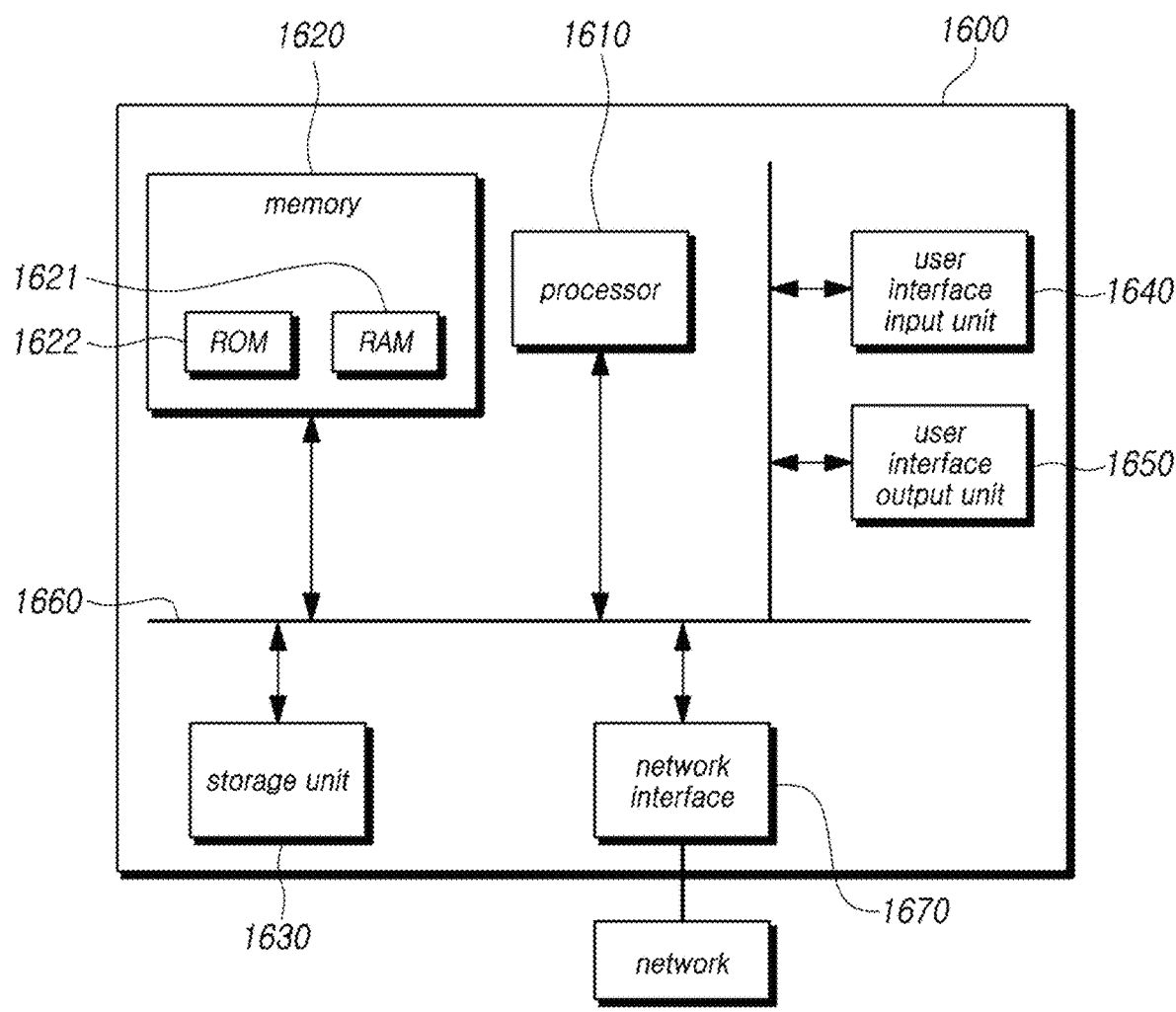
FIG. 16 illustrates an example of hardware components, such as a transceiver and a signal processor, included in a radar device according to the present embodiments.

FIG. 16 illustrates an example of hardware components, such as a transceiver and a signal processor, included in a radar device according to the present embodiments.

Referring to FIG. 16, the transceiver 200, the signal processor 300, the target angle estimator 400, and the target size information estimator 500 of the radar device according to the present embodiments may be implemented as hardware or software components implemented in a computer system.

In other words, the controller of the transceiver 200, the signal processor 300, the target angle estimator 400, and the target size information estimator 500 of the above-described radar device may be implemented as a computer device having the hardware as shown in FIG. 12.

As illustrated in FIG. 12, the computer system 1600 of implementing the radar device according to the present embodiments or the transceiver or signal processor 300, target angle estimator 400, and target size information estimator 500 included therein may include at least one of one or more processors 1610, a memory 1620, a storage unit 1630, a user interface input unit 1640, and a user interface output unit 1650 which may communicate with each other via a bus 1660.

The computer system 1600 may further include a network interface 1670 for connecting to a network. The processor 1610 may be a central processing unit (CPU) or semiconductor device that executes processing instructions stored in the memory 1620 and/or the storage unit 1630. The memory 1620 and the storage unit 1630 may include various types of volatile/non-volatile storage media. For example, the memory 1200 may include a read only memory (RAM) 1621 and a random access memory (ROM) 1622.

Further, the computer system 1600 used in the present embodiments may include a software module of performing a function of processing reception signals to detect a plurality of peak signals and separately detecting Nt*Nr channel reception signals corresponding to each peak signal, a software module performing a function of arbitrarily selecting some of the plurality of channel reception signals corresponding to each peak signal to calculate a plurality of target angle estimates, and a software module performing a function of obtaining length information about the target based on the plurality of target angle estimates.

The processor (MCU) 1210 of the radar device according to the present embodiments may execute the above-described software modules stored in a storage unit 1630 or a memory 1620 to perform corresponding functions.

As described above, if the radar device according to the present embodiments is used, target angle estimates may be calculated from k channel reception signals selected from among a plurality of channel reception signals corresponding to each peak signal, and size information about the target may be exactly estimated based on up to Nt*NrC2 target angle estimates thus calculated.

As such, it is possible to enhance the detection performance of radar and the control performance of the host vehicle by controlling the host vehicle considering even the target size information.

Although it is described above that all of the components are combined into one or are operated in combination, embodiments of the disclosure are not limited thereto. One or more of the components may be selectively combined and operated as long as it falls within the scope of the objects of the embodiments. Further, although all of the components may be implemented in their respective independent hardware components, all or some of the components may be selectively combined to be implemented in a computer program with program modules performing all or some of the functions combined in one or more hardware components. The codes and code segments constituting the computer program may be easily inferred by one of ordinary skill in the art to which the disclosure pertains. The computer program may be stored in computer readable media and be read and executed by a computer to implement embodiments of the disclosure. The storage medium of the computer program may include a magnetic recording medium, an optical recording medium, a carrier wave medium, and the like.

When an element "comprises," "includes," or "has" another element, the element may further include, but rather than excluding, the other element, and the terms "comprise," "include," and "have" should be appreciated as not excluding the possibility of presence or adding one or more features, numbers, steps, operations, elements, parts, or combinations thereof. All the scientific and technical terms as used herein may be the same in meaning as those commonly appreciated by a skilled artisan in the art unless defined otherwise. It will be further understood that terms, such as those defined dictionaries, should be interpreted as having a meaning that is consistent with their meaning in the context of the relevant art and will not be interpreted in an idealized or overly formal sense unless expressly so defined herein.

The above description has been presented to enable any person skilled in the art to make and use the technical idea of the disclosure, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the disclosure. The above description and the accompanying drawings provide an example of the technical idea of the disclosure for illustrative purposes only. That is, the disclosed embodiments are intended to illustrate the scope of the technical idea of the disclosure. Thus, the scope of the disclosure is not limited to the embodiments shown, but is to be accorded the widest scope consistent with the claims. The scope of protection of the disclosure should be construed based on the following claims, and all technical ideas within the scope of equivalents thereof should be construed as being included within the scope of the disclosure.

What is claimed is:

1. A vehicle radar device, comprising:
   an antenna unit including Nt transmission antennas and Nr reception antennas, wherein Nt is a natural number equal to or larger than 1, and Nr is a natural number equal to or larger than 2;
   a transceiver controlling the transmission antenna to transmit a transmission signal and the reception antenna to receive a reception signal reflected by a target;
   a signal processor detecting one or more peak signals for the target and separately detecting Nt*Nr channel reception signals corresponding to each peak signal;
   a target angle estimator calculating a target angle estimate from k channel reception signals selected from among the Nt*Nr channel reception signals; and
   a target size information estimator calculating size information about the target based on a plurality of target points determined by up to $_{Nt*Nr}C_k$—a value calculated by a combination operation for selecting k from among Nt*Nr—target angle estimates for each peak signal and a distance to the target determined by a frequency component of each peak signal,
   wherein the target size information estimator determines first target points during a first detection period, determines second target points during a second detection period after the first detection period, converts the first target points into positions corresponding the second detection period, and calculates the size information about the target using the second target points and the converted positions of the first target points.

2. The vehicle radar device of claim 1, wherein k is 2, and wherein the target angle estimator calculates the target angle estimate ($\widehat{\theta_{ij}}$) based on a distance difference ($dn_{ij}$) and a phase difference ($\varphi_{ij}$) between a selected i-channel reception signal and a selected j-channel reception signal.

3. The vehicle radar device of claim 2, wherein the target angle estimate ($\widehat{\theta_{ij}}$) is calculated by:

$$\hat{\theta}_{ij} = \arcsin\left(\frac{\phi_{ij} \times \lambda}{2\pi \times dn_{ij}}\right),$$

wherein λ is a wavelength corresponding to a frequency component of a corresponding peak signal, $\varphi_{ij}$ is a phase difference between a selected i-channel reception signal and a selected i-channel reception signal, and $dn_{ij}$ is a distance difference corresponding to a spacing between an i-channel reception antenna and a j-channel reception antenna.

4. The vehicle radar device of claim 1, wherein when Nt is 2 or more, Nt transmission antennas transmit two or more transmission signals having orthogonality.

5. The vehicle radar device of claim 4, wherein the orthogonality between the two or more transmission signals is implemented by one of time division multiplexing, code division multiplexing, and frequency division multiplexing.

6. The vehicle radar device of claim 5, wherein the transmission signal includes a plurality of chirp signals, and wherein the signal processor performs a first Fourier transform (1st FFT) on the reception signal to obtain a time component according to a range and performs a second Fourier transform (2nd FFT) to generate a range-Doppler map representing speed information according to the range.

7. The vehicle radar device of claim 6, wherein the signal processor distinguishes a corresponding peak signal and Nt*Nr channel reception signals corresponding thereto, based on a range-speed index for each detection period.

8. A method for controlling a radar device, the method comprising:
   transmitting a transmission signal from Nt transmission antennas and receiving a reception signal reflected by a target from Nr reception antennas, wherein Nt is a natural number equal to or larger than 1, and Nr is a natural number equal to or larger than 2;

processing the reception signal to detect one or more peak signals for the target and separately detecting Nt*Nr channel reception signals corresponding to each peak signal;

calculating a target angle estimate from k channel reception signals selected from among the Nt*Nr channel reception signals; and calculating size information about the target based on a plurality of target points determined by up to $_{Nt*Nr}C_k$—a value calculated by a combination operation for selecting k from among Nt*Nr—target angle estimates for each peak signal and a distance to the target determined by a frequency component of each peak signal, wherein the calculating size information includes determining first target points during a first detection period, determining second target points during a second detection period after the first detection period, converting the first target points into positions corresponding the second detection period, and calculating the size information about the target using the second target points and the converted positions of the first target points.

9. The method of claim 8, wherein k is 2, and wherein calculating the target angle estimate includes calculating the target angle estimate ($\widehat{\theta_{ij}}$) based on a distance difference ($dn_{ij}$) and a phase difference ($\varphi_{ij}$) between a selected i-channel reception signal and a selected j-channel reception signal.

10. The method of claim 9, wherein the target angle estimate ($\widehat{\theta_{ij}}$) is calculated by:

$$\hat{\theta}_{ij} = \arcsin\left(\frac{\phi_{ij} \times \lambda}{2\pi \times dn_{ij}}\right),$$

wherein $\lambda$ is a wavelength corresponding to a frequency component of a corresponding peak signal, $\varphi_{ij}$ is a phase difference between a selected i-channel reception signal and a selected j-channel reception signal, and $dn_{ij}$ is a distance difference corresponding to a spacing between an i-channel reception antenna and a j-channel reception antenna.

11. The method of claim 8, wherein when Nt is 2 or more, Nt transmission antennas transmit two or more transmission signals having orthogonality.

12. The method of claim 11, wherein the orthogonality between the two or more transmission signals is implemented by one of time division multiplexing, code division multiplexing, and frequency division multiplexing.

13. The method of claim 12, wherein the transmission signal includes a plurality of chirp signals, and wherein separately detecting the Nt*Nr channel reception signals includes performing a first Fourier transform (1st FFT) on the reception signal to obtain a time component according to a range and performing a second Fourier transform (2nd FFT) to generate a range-Doppler map representing speed information according to the range.

14. The method of claim 13, wherein separately detecting the Nt*Nr channel reception signals includes distinguishing a corresponding peak signal and Nt*Nr channel reception signals corresponding thereto, based on a range-speed index for each detection period.

* * * * *